United States Patent
Kaminsky et al.

(10) Patent No.: US 6,874,015 B2
(45) Date of Patent: Mar. 29, 2005

(54) PARALLEL CDN-BASED CONTENT DELIVERY

(75) Inventors: David L. Kaminsky, Chapel Hill, NC (US); David M. Ogle, Cary, NC (US); Richard D. Telford, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 10/320,198

(22) Filed: Dec. 16, 2002

(65) Prior Publication Data

US 2004/0117455 A1 Jun. 17, 2004

(51) Int. Cl.$^7$ ............................................... G06F 15/167
(52) U.S. Cl. ...................................................... 709/214
(58) Field of Search ............................... 711/156, 165; 709/213, 214, 219, 224, 228

(56) References Cited

U.S. PATENT DOCUMENTS

| | | | |
|---|---|---|---|
| 5,724,552 A | * | 3/1998 | Taoda .......................... 711/165 |
| 6,195,680 B1 | | 2/2001 | Goldszmidt et al. ......... 709/203 |
| 2003/0204602 A1 | * | 10/2003 | Hudson et al. ............... 709/228 |

OTHER PUBLICATIONS

Wetzel, R., "CDN Business Models–Not All Cast from the Same Mold," *Business Communications Review*, (May, 2001).

* cited by examiner

*Primary Examiner*—Hiep T. Nguyen
(74) *Attorney, Agent, or Firm*—Synnestvedt & Lechner LLP; Jeanine Ray-Yarletts; Bruce Clay

(57) ABSTRACT

CDNs and inexpensive and available local (client) storage are combined to increase the efficiency of content delivery and improve the user experience. A large-content element, such as a video file, is stored in segments on one or more servers, allowing clients to make simultaneous requests for segments of the content in parallel. A CDN responds to these requests, optimizing the use of the resources on the CDN nodes. The responses from the CDN are cached during an intermediate process and then delivered, in proper order, to the requesting client. By requesting segments of the content element from multiple locations in parallel rather than requesting a single file containing the entire content element, the burden on the CDN nodes is reduced. Further, since the segments are requested in parallel, cost-of-delivery issues can be factored into the delivery schedule more easily (e.g., bandwidth, time of delivery, whether data is cached), thereby making the delivery process smoother and more economical.

22 Claims, 4 Drawing Sheets

PARALLEL CDN-BASED CONTENT DELIVERY

BACKGROUND OF THE INVENTION

1. Field of the Invention

This invention relates generally to providing content from a server environment to a client over a network such as the internet, and more particularly, a method, system, and computer program product for increasing the efficiency of providing content.

2. Description of the Related Art

Broadband internet access is becoming commonplace as network technology improves. More and more, consumers connect to the internet via cable modems, DSL connections and other such high-speed connections. Because consumers have access to the internet at these high speeds, the size and frequency of downloaded material has increased dramatically. Internet-delivered video, which was impractical using even the fastest dial-up connection, is becoming more practical and commonplace today. As a result, significant research has gone into increasing the efficiency of delivering video via the internet, for example, by using Content Distribution Networks (CDNs).

CDNs were developed to handle large transmissions of web content occurring over the internet. CDNs store and serve content from many distributed locations rather than from a few centralized origin points. In many instances, CDNs store replicas of content near user locations, e.g., on edge servers, so that frequently used content can be quickly retrieved. This improves the quality of content delivery to end-users and lowers network congestion.

There are three basic elements involving any transmission of content from a server to a client. The first element is the server itself, which is the storage source of the content being provided. Typically, the server is maintained by a content provider and is accessible via a web site or direct network connection. The second element in the transmission is the network itself. The network typically includes the Internet, comprising backbone carriers who provide wide-area transport for Internet Service Providers (ISPs), who in turn provide end users with Internet connectivity. The third element, the client, typically is an end user using a PC at home or office. The client is typically the entity requesting the content from the server.

Each element of the transaction involves the use of significant resources. At the server, large files such as video content require large storage areas (typically disk drives) and use many server cycles and disk cycles to retrieve the video from storage and send it on its way out over the network. On the network, optimal functionality hinges on the bandwidth, where wider is better. Finally, at the client, streaming video must be buffered as it is received in order for it to be properly viewed. Thus, significant memory and processing power is required to decode, play, and store the video content at the client.

The past models for providing efficient delivery and use of large content files such as video involved maximizing the use of the first two elements, i.e., the servers and wide band networks. For example, server caches are used to store blocks of content that are frequently or recently requested, so that the time consumed in reading the block from the disk storage of the server can be saved. These models were developed at a time when all forms of memory at the client (including disk storage devices such as hard drives) were expensive and, thus, fairly limited. Thus, developers of current systems turned a blind eye to the client when developing improved content delivery systems.

Within the last several years, however, client-side memory costs have dropped dramatically in price. Forty-gigabyte (40 GB) hard drives are now standard on personal computer systems and significantly larger hard drives are available at a minimal price. As noted above, prior art models do not take into consideration the large storage size now available on client machines. Accordingly, it would be desirable to have a method and system for providing large content delivery, such as video, that takes advantage of the current prevalence of the relatively inexpensive large data storage available on client machines.

SUMMARY OF THE INVENTION

The present invention combines the use of CDNs and inexpensive and available local (client) storage to increase the efficiency of content delivery and improve the user experience. In accordance with the present invention, a large-content element, such as a video file, is stored in segments on one or more servers, allowing clients to make simultaneous requests for segments of the content in parallel. A CDN responds to these requests, optimizing the use of the resources on the CDN nodes. The responses from the CDN are cached during an intermediate process and then delivered, in proper order, to the requesting client. By requesting segments of the content element from multiple locations in parallel rather than requesting a single file containing the entire content element, the burden on the CDN nodes is reduced. Further, since the segments are requested in parallel, cost-of-delivery issues can be factored into the delivery schedule more easily (e.g., bandwidth, time of delivery, whether data is cached), thereby making the delivery process smoother and more economical.

DETAILED DESCRIPTION OF THE PREFERRED EMBODIMENTS

Figure 1:
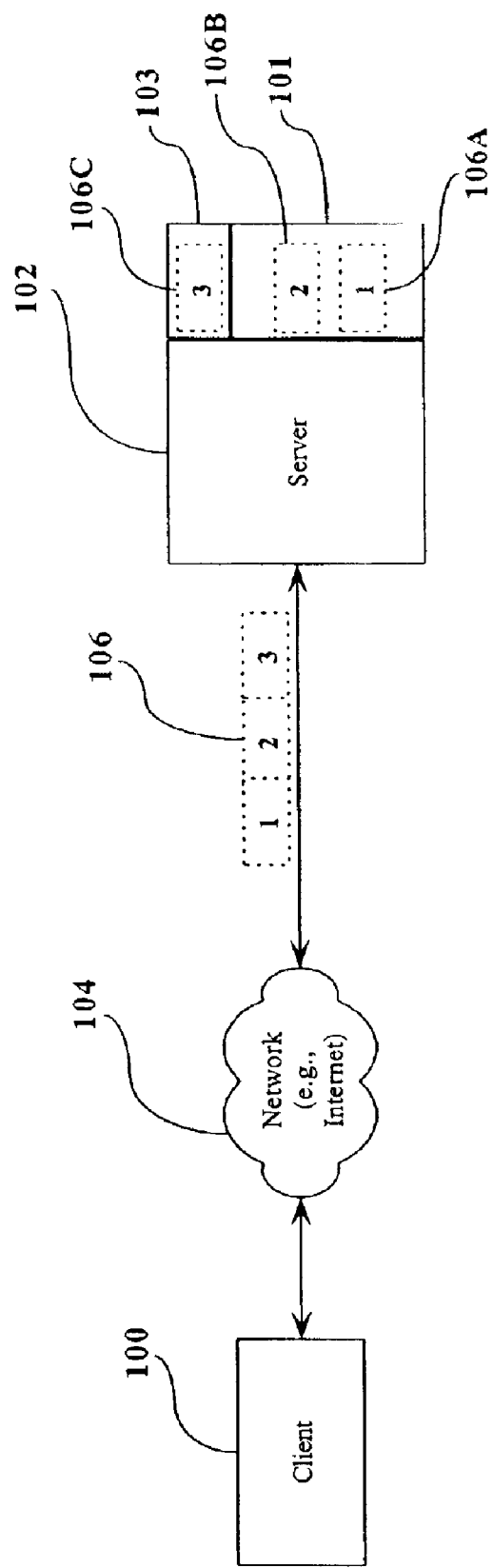
FIG. 1 illustrates the system and method of the prior art.

FIG. 1 illustrates the system and method of the prior art. Referring to FIG. 1, a client 100 communicates with a server 102 via a network 104 such as the Internet. A content element 106 (comprising three segments 106a, 106b, and 106c) is stored in a disk storage area 101 of server 102. Server 102 also has access to cache memory 103, for retrieval of content that is more often or has been more recently retrieved. In the embodiment illustrated in FIG. 1, segment 106c is stored in cache 103 while segments 106a and 106b are stored in disk storage area (i.e., hard disk) 101. For the purpose of this example, it is assumed that cache 103 is of a size limiting it to storage of a single segment of content element 106 at any given time.

As can be seen from FIG. 1, the three segments comprising content element 106 are numbered in sequence, i.e., 1, 2, 3. For the purposes of this explanation, it is assumed that the proper order for display or reading of the content element 106 is sequential and ascending, i.e., the first segment logically goes at the beginning of the content element 106, the second segment is next, followed by the third segment. Thus, for example, if content element 106 represents a movie in video format, segment 106a represents the beginning of the movie, segment 106b represents the middle of the movie, and segment 106c represents the end of the movie.

The operation of the prior art system illustrated in FIG. 1 is as follows. A client 100 sends a request over the network 104 to server 102 asking that content element 106 be delivered for use. Upon receiving this request, server 102 will retrieve the content from disk storage area 101 or, if available in cache, from cache 103. Server 102 then begins transmitting the content element 106 over the network back to client 100. The transmission of the content element 106 can be streaming, that is, as a continuous and sequential set of bytes, or it can be divided into segments and transmitted discretely. Each content element is sent in proper sequence, such that segment 106c is delivered first, segment 106b is delivered second, and segment 106c is delivered third. It is understood that it is not necessary that content element 106 be divided into segments and could instead be a single segment representing the entire content element.

Serial delivery has several drawbacks. First, where the content is of a type that will be played or viewed by the requester (e.g., video or audio content), if the network cannot pass data sufficiently fast, the playback can be interrupted while the client awaits more data. When this problem is addressed by buffering data, the viewer must initially wait while a sufficiently large buffer is filled. This detracts from the viewing experience.

Second, serial delivery does not exploit the benefits of caching within storage devices. With serial delivery, all data is delivered from a single server, which means either that the server must have a sufficiently large cache to store the entire data set, or that many disk operations are required to deliver content that is stored on the disk drive of the server instead of in cache. In the example of FIG. 1, since only one segment can be stored in cache 103 at any given time, segment 106a, the first to be delivered, must either be read directly from disk (which is very slow) or moved into cache 103, thereby evicting segment 106c from the cache. Since cache memory is expensive, using a larger cache will increase the cost of the server. Retrieving data from disk is far slower than retrieving data from cache, so if the system does not have sufficient cache memory, its overall throughput is lower.

Various attempts have been made to try to speed up the delivery of content segments to clients. For example, prior art systems make use of multiple servers, with each server storing its own copy of the entire content element 106 thereon. By distributing multiple copies of the content element 106 among multiple servers, a less burdened server can be used to deliver the content. Similarly, if the multiple servers are delivering the content at different speeds (e.g., server 1 is transmitting over a wide band network and server 2 is transmitting over a narrow band network) the system can take advantage of the faster delivery if the faster delivery connection is available, and still fall back and deliver the content from the slower server if the faster server is otherwise occupied. In all cases of the prior art, however, the content is delivered in full from a single server.

Figure 2:
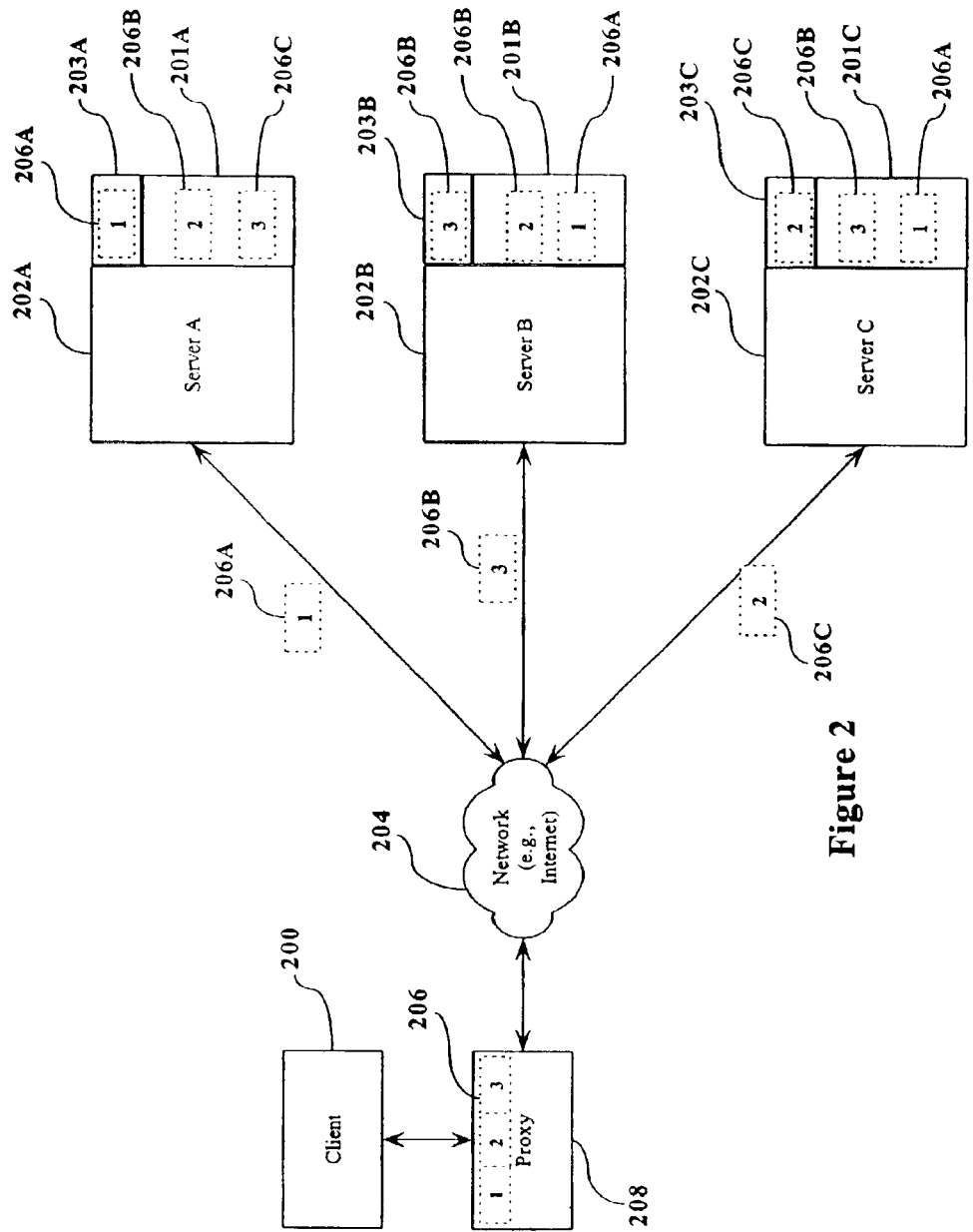
FIG. 2 illustrates the system and method of the present invention.

FIG. 2 illustrates the system and method of the present invention. Referring to FIG. 2, a client 200 communicates with plural servers 202a, 202b, 202c over a network 204. Servers 202a, 202b, and 202c store content in disk storage areas 201a, 201b, and 201c and caches 203a, 203b, and 203c, respectively. A proxy 208 may be provided between the client 200 and the servers (or within the client 200 itself), the function of which will be described below.

The segments of the content element 206 are individually stored on the servers. In this example, each server stores a complete copy of content element 206. Segment 206a is stored in cache 203a on server 202a, segment 206b is stored in cache 203b on server 202b, and segment 206c is stored in cache 203c on server 202c. If desired, copies of all segments do not have to be provided on each of the various servers, i.e., server 202a could store elements 206a and 206b; server 202b could also store elements 206a and 206b, and server 202c could store element 206c alone, or all three elements. Alternatively, server 202a could be reserved for storage of the first segment of all content elements, server 202b could be reserved for storage of the middle segment of all content elements, and server 202c could be reserved for storage of the last segment of all content elements.

Proxy 208 performs multiple functions and, although illustrated in FIG. 2 as a single proxy separate from client 200, the various functions of the proxy can be divided and performed by separate proxies located on the same or different systems, either on the client 200 or separate from the client 200.

One function of proxy 208 is to select which server (in this example, server 202a, 202b, or 202c) should deliver a particular content element. This proxy is referred to herein as the "request router". A second function is to cache results and deliver them, in proper order, to the client. This proxy is referred to herein as the system cache.

Using this configuration, when a client makes a request for content element 206, the request router first identifies which of the servers are storing the various individual elements of content element 206 and, of those, which have the requested content already stored in the server's cache. Thus, the client has access to more cache space than in the single-server situation of the prior art. Where in the prior art there might only be cache memory available for serving one segment from cache, in accordance with the present invention, it is possible that all three segments will be available from among the multiple available caches. As an example, each different segment is illustrated in FIG. 2 as being available from cache, thus increasing the speed of the delivery process.

The request router then decides which elements should be retrieved first and which can be delayed, if desired. Finally, the request router directs the servers to deliver the individual elements to the system cache, keeping in mind the considerations of sequence, to be described in more detail below. As the elements are received by the system cache, they can be fully assembled before delivery to the client 200, or the first segment can be delivered to client 200 with the understanding that the remaining segments will be delivered in the proper sequence to avoid delays of display.

Figure 3:
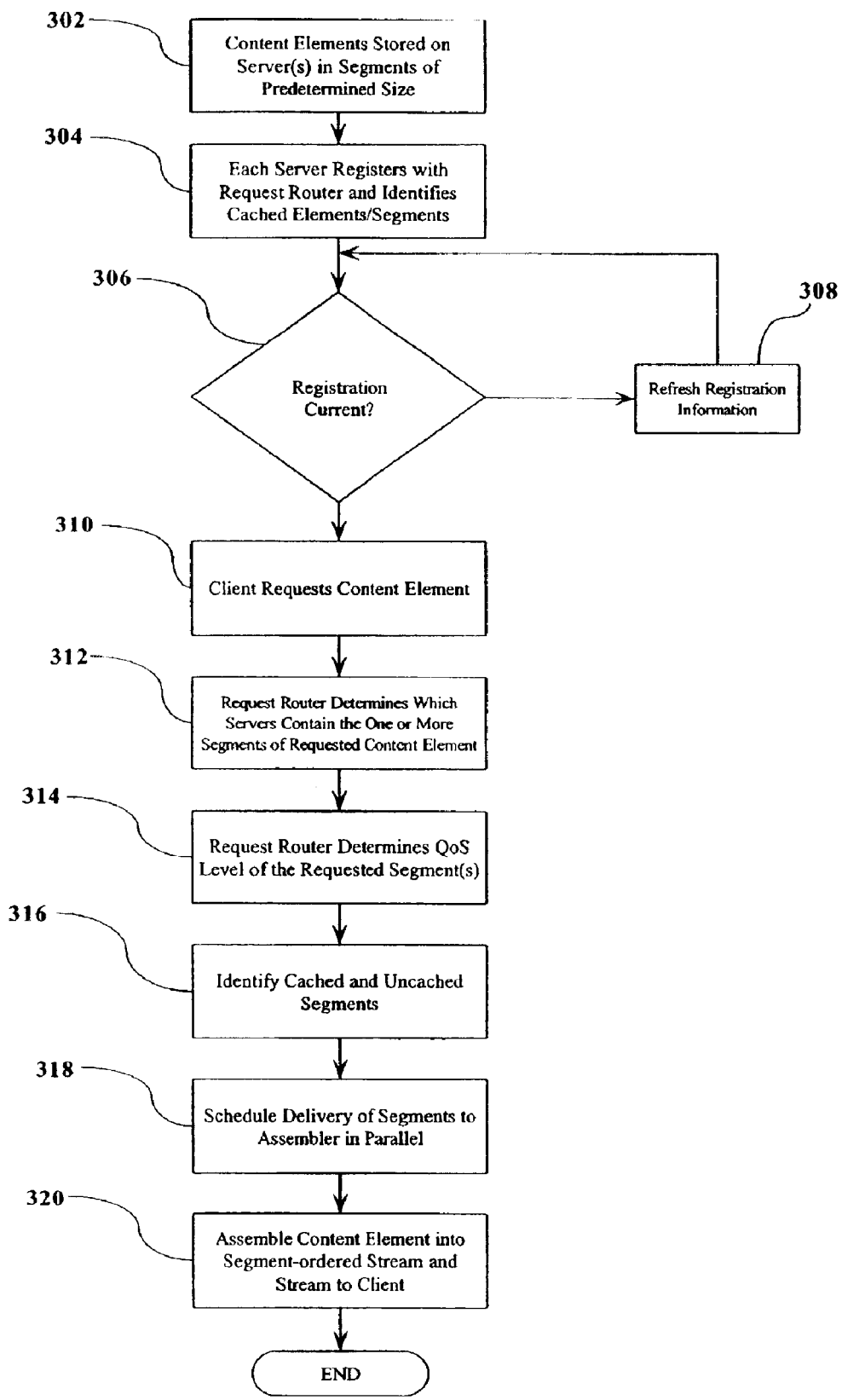
FIG. 3 is a flowchart illustrating the basic steps required for setting up the system for delivery of content and delivering the content in accordance with the present invention.

FIG. 3 is a flowchart illustrating the basic steps required for setting up the system for delivery of content and delivering the content in accordance with the present invention. Referring to FIG. 3, at step 302, the content element is stored on one or more servers in segments of a predetermined size. In a preferred embodiment, the segments are distributed among several servers so that the server load can be shared among the multiple servers in a known manner. The size of the segments stored on the servers can vary as long as the segment size is known in advance.

At step 304, each server registers with a request router and identifies (a) the content/elements/segments stored thereon and (b) the cached content/elements/segments stored thereon since, as is well known, retrieval from cache memory is preferable to retrieval from non-cache memory. It is important that the registration information remain current so that, when content is requested, the request router knows where the content actually is stored at that time. Thus, at step 306, a determination is made as to whether or not the registration is current. If, at step 306, it is determined not to be current, then at step 308, the registration information is refreshed.

The determination of the currentness of the registration can be made in a variety of ways. In a preferred embodiment, the server can be configured to notify the request router whenever there is a change in the state of the content (e.g., the content itself has changed; the content has been deleted or moved to a different storage location; the content is stored in cache memory, etc.). For example, the server could notify the request router of any state changes pertaining to the content; when the request router sends a request to the server, the request router can include with the request an indication as to the assumed status of the content (e.g., cached or non-cached); when the server receives the request, it compares the assumed status with the actual status; if the assumed status matches the actual status, the request is processed; if the assumed status does not match the actual status but the actual status is more favorable than the assumed status (e.g., the assumed status is "uncached" but the actual status is "cached"), then the request is processed, and the updated status (e.g., "cached") is returned with the processed request, so that the registered status is now correct; if the assumed status is less favorable that the actual status (e.g., the assumed status is "cached" but the actual status is "uncached"), then the request is not processed, and an updated status is returned to the request router, and the request is remade by the request router.

The reason for not immediately serving the request when the assumed status is less favorable than the actual status is that there may exist a more favorable alternative for serving the content. For example, it may be that the request can be served from a different server that already has the content cached, and thus it would be quicker to serve the data from this different server than to serve the content from the uncached copy in the first server. Thus, when the status is wrong and the error does not favor the requester of the content, the status is updated and the request router then reassesses where to go to find the content.

At step 310, with the server registration refreshed, the client requests a content element. At step 312, the request router determines which of the servers contain the one or more segments of the requested content elements. This information can be gleaned from the registration information, which makes available to the request router each content element and each segment available on each server.

At step 314, the request router determines the quality of service (QoS) level of the requested segments. Thus, for example, the first segment of a video will typically require a higher QoS level than will, for example, the last segment. One reason for this is that the user will want to begin viewing the video as soon as possible, and the first segment is obviously the most critical at that point in time. In addition, however, often users are charged for the content delivery and in many systems, users are charged a higher price for content having a higher QoS level. Thus, requests for segments appearing at the end of a video, for example, can still be made in parallel with requests for the first segment, but they can be requested with a lower QoS value, thereby reducing delivery cost. If at some point during the transmission, the segment requested with the lower QoS value is needed more quickly than originally expected, the original low QoS request can be canceled and a new, higher QoS request can be submitted. This ensures low cost while maintaining the integrity of data delivery. In other words, in accordance with the present invention, it is possible to pick and choose QoS values for various elements of the transmission and change them as needed, even in the middle of a transmission, thus reducing delivery costs.

At step 316, the request router determines which of the segments are cached and which are uncached.

At step 318, the request router schedules delivery of the segments to the assembler, utilizing parallel processing so that as many segments as possible can be delivered simultaneously, scheduling delivery of cached segments where available.

Finally, at step 320, the system cache assembles the content element into a segment-ordered stream which is available for streaming to the client for viewing.

Figure 4:
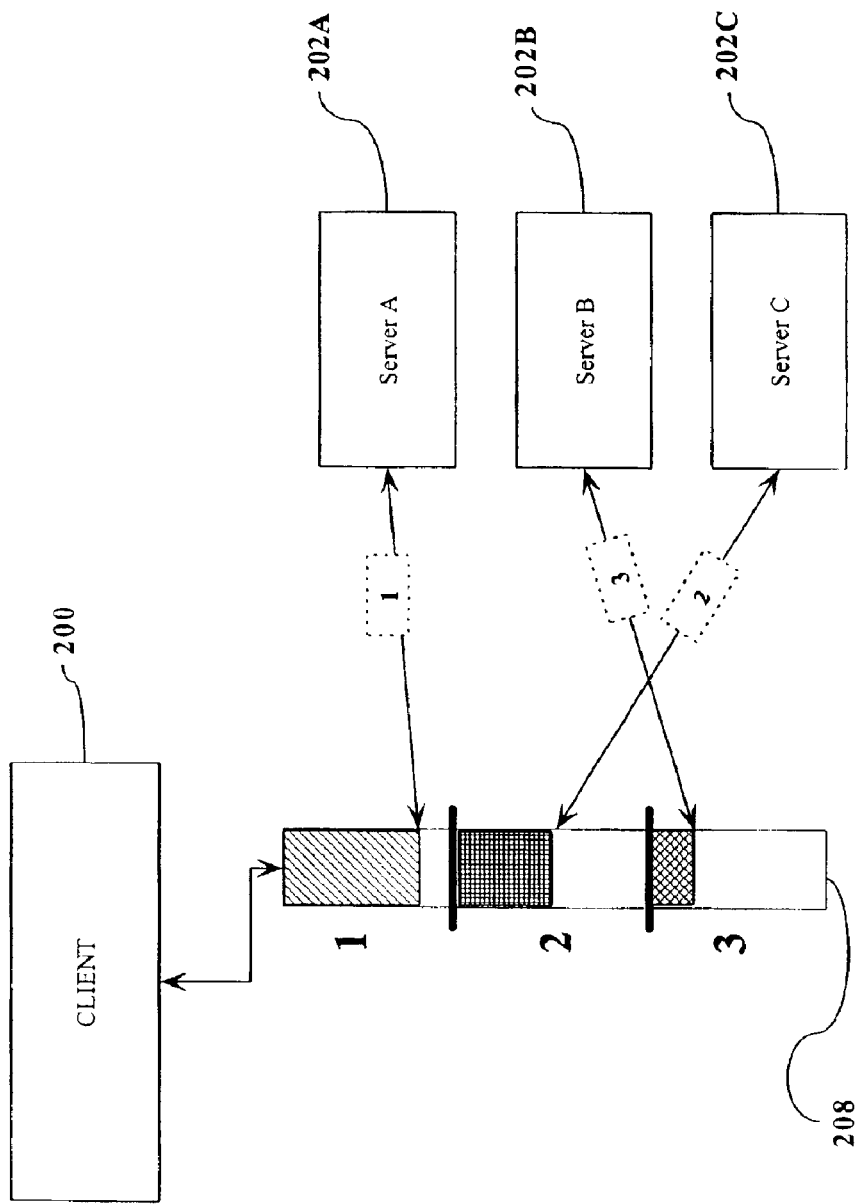
FIG. 4 illustrates the delivery of the content segments based on the sequence with which they will be delivered to the client.

FIG. 4 illustrates the delivery of the content segments based on the sequence with which they will be delivered to the client. FIG. 4 is simplified to show only the interaction between the servers 202A–202C and the system cache in proxy 208, and the interaction between the system cache in proxy 208 and the client 200; thus, many system elements are not shown in FIG. 4 for the purpose of simplicity.

Referring to FIG. 4, based on the assumption that the first content segment is in cache in server 202A, the second content segment is in cache in server 202C, and the third content segment is in server 202B, and that each content segment is 10 MB in size, the content segments are delivered to the system cache in proxy 208 so that they are lined up in the order that they will be delivered to client 200. The shaded portions of proxy 208 indicate the amount of each 10 MB segment are currently stored in the proxy 208; as can be seen, despite the fact that, in our example, each of the content elements were requested at the same time, the first content element is almost completely delivered to it's assigned area in proxy 208, less of the second segment has been delivered, and even less of the third content segment has been delivered. This can occur because the first segment has a higher QoS than the second or third segments (since it will be the first delivered to the client), and the second segment has higher QoS than the third. This allows the system to take advantage of the various economies available with using a lower QoS where possible, while still being able to satisfy the needs of the client for quick access to the requested data.

Using the present invention, therefore, a user can begin viewing content as it is received and, at the same time, store simultaneously-loading segments while viewing the earlier-received, more important segments. As the additional segments are received, they can be viewed as well. This is made possible because users now have access to large storage capacity on existing systems, such capacity not having been available in the past.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type. In a client/server environment, such software programming code may be stored with storage associated with a server or with a client. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1–4 support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method for delivering a content element having a predetermined output sequence to a requestor, comprising the steps of:
   dividing said content element into two or more content segments;
   storing said content segments in two or more diverse storage locations;
   delivering, in parallel, at least two of said two or more content segments upon request for said content element by said requester; and
   outputting said at least two or more content segments to said requester based on said predetermined output sequence.

2. A method for delivering a content element to a requestor, comprising the steps of:
   dividing said content element into two or more content segments;
   storing said content segments in two or more diverse storage locations; and
   delivering, in parallel, at least two of said two or more content segments upon request for said content element by said requester, wherein said delivering step includes at least the steps of:
   determining an optimal delivery schedule for said content segments making up said content element based on a predetermined criteria; and
   delivering said requested content segments to said requestor in parallel based on said optimal delivery schedule.

3. The method of claim 2, wherein said predetermined criteria gives preference to delivery of content segments based on a QoS value of each content segment.

4. The method of claim 2, wherein said content element has a predetermined delivery sequence, and wherein said delivering step includes at least the steps of:
   storing said requested content segments in a system cache; and
   delivering said requested content segments to said requester from said system cache in accordance with the predetermined delivery sequence.

5. The method of claim 3, wherein each of said diverse storage locations includes a server cache, and wherein said predetermined criteria gives preference to delivery of content segments based on delivery speed, wherein said determining step further includes at least the steps of:
   identifying which of said content segments are stored in server cache; and
   scheduling the delivery of said content segments making up said content element, giving priority to delivering content segments stored in a server cache over content segment not stored in a server cache.

6. The method of claim 3, wherein each of said diverse storage locations includes a server cache, and wherein said predetermined criteria gives preference to delivery of content segments based on sequence-of-use by the requestor and delivery speed, wherein said determining step further includes at least the steps of:
   identifying which of said content segments are stored in a server cache;
   identifying the order of delivery of said content segments to satisfy the sequence-of-use criteria; and
   scheduling the delivery of said content segments making up said content element, giving priority first to content segments at the beginning of the sequence-of-use and then to delivering, in the identified order, content segments stored in a server cache over content segment not stored in a server cache.

7. The method of claim 3, wherein said predetermined criteria gives preference to delivery of content segments based on the QoS value of each content segment and the sequence-of-use by the requestor, wherein said determining step includes at least the steps of:
   identifying the QoS value of each requested content segments;
   identifying the order of delivery of said content segments to satisfy the sequence-of-use criteria; and
   scheduling the delivery of said content segments making up said content element based on said QoS values and said sequence-of-use criteria.

8. The method of claim 2, further comprising the steps of:
   performing a registration process for each of said diverse storage locations to identify the content segments stored thereon and their storage address within said diverse storage locations.

9. A system for delivering a content element to a requestor, comprising:
   means for dividing said content element into two or more content segments;
   means for storing said content segments in two or more diverse storage locations; and
   means for delivering, in parallel, at least two of said two or more content segments upon request for said content element by said requester, wherein said means for delivering includes:

means for determining an optimal delivery schedule for said content segments making up said content element based on a predetermined criteria; and means for delivering said requested content segments to said requestor in parallel based on said optimal delivery schedule.

10. The system of claim 9, wherein said predetermined criteria gives preference to delivery of content segments based on a QoS value of each content segment.

11. The system of claim 9, wherein said content element has a predetermined delivery sequence, and wherein said means for delivering includes:

means for storing said requested content segments in a system cache; and means for delivering said requested content segments to said requester from said system cache in accordance with the predetermined delivery sequence.

12. The system of claim 10, wherein each of said diverse storage locations includes a server cache, and wherein said predetermined criteria gives preference to delivery of content segments based on delivery speed, wherein said means for determining further includes:

means for identifying which of said content segments are stored in server cache; and means for scheduling the delivery of said content segments making up said content element, giving priority to delivering content segments stored in a server cache over content segment not stored in a server cache.

13. The system of claim 10, wherein each of said diverse storage locations includes a server cache, and wherein said predetermined criteria gives preference to delivery of content segments based on sequence-of-use by the requestor and delivery speed, wherein said means for determining further includes:

means for identifying which of said content segments are stored in a server cache;

means for identifying the order of delivery of said content segments to satisfy the sequence-of-use criteria; and means for scheduling the delivery of said content segments making up said content element, giving priority first to content segments at the beginning of the sequence-of-use and then to delivering, in the identified order, content segments stored in a server cache over content segment not stored in a server cache.

14. The system of claim 10, wherein said predetermined criteria gives preference to delivery of content segments based on the QoS value of each content segment and the sequence-of-use by the requestor, wherein said means for determining includes:

means for identifying the QoS value of each requested content segments;

means for identifying the order of delivery of said content segments to satisfy the sequence-of-use criteria; and means for scheduling the delivery of said content segments making up said content element based on said QoS values and said sequence-of-use criteria.

15. The system of claim 9, further comprising:

means for performing a registration process for each of said diverse storage locations to identify the content segments stored thereon and their storage address within said diverse storage locations.

16. A computer program product recorded on computer readable medium for delivering a content element to a reguestor, comprising:

computer readable means for dividing said content element into two or more content segments;

computer readable means for storing said content segments in two or more diverse storage locations; and computer readable means for delivering, in parallel, at least two of said two or more content segments upon request for said content element by said requester, wherein said computer readable means for delivering includes:

computer readable means for determining an optimal delivery schedule for said content segments making up said content element based on a predetermined criteria; and computer readable means for delivering said requested content segments to said requestor in parallel based on said optimal delivery schedule.

17. The computer program product of claim 16, wherein said predetermined criteria gives preference to delivery of content segments based on a QoS value of each content segment.

18. The computer program product of claim 16, wherein said content element has a predetermined delivery sequence, and wherein said computer readable means for delivering includes:

computer readable means for storing said requested content segments in a system cache; and computer readable means for delivering said requested content segments to said requester from said system cache in accordance with the predetermined delivery sequence.

19. The computer program product of claim 17, wherein each of said diverse storage locations includes a server cache, and wherein said predetermined criteria gives preference to delivery of content segments based on delivery speed, wherein said computer readable means for determining further includes:

computer readable means for identifying which of said content segments are stored in server cache; and computer readable means for scheduling the delivery of said content segments making up said content element, giving priority to delivering content segments stored in a server cache over content segment not stored in a server cache.

20. The computer program product of claim 17, wherein each of said diverse storage locations includes a server cache, and wherein said predetermined criteria gives preference to delivery of content segments based on sequence-of-use by the requestor and delivery speed, wherein said computer readable means for determining further includes:

computer readable means for identifying which of said content segments are stored in a server cache;

computer readable means for identifying the order of delivery of said content segments to satisfy the sequence-of-use criteria; and computer readable means for scheduling the delivery of said content segments making up said content element, giving priority first to content segments at the beginning of the sequence-of-use and then to delivering, in the identified order, content segments stored in a server cache over content segment not stored in a server cache.

21. The computer program product of claim 17, wherein said predetermined criteria gives preference to delivery of content segments based on the QoS value of each content segment and the sequence-of-use by the requestor, wherein said computer readable means for determining includes:

computer readable means for identifying the QoS value of each requested content segments;

computer readable means for identifying the order of delivery of said content segments to satisfy the sequence-of-use criteria; and computer readable means for scheduling the delivery of said content segments making up said content element based on said QoS values and said sequence-of-use criteria.

22. The computer program product of claim 16, further comprising:

computer readable means for performing a registration process for each of said diverse storage locations to identify the content segments stored thereon and their storage address within said diverse storage locations.

* * * * *